July 7, 1942.   J. A. FOTIE   2,288,693
WELDING APPARATUS
Filed Aug. 20, 1941   3 Sheets-Sheet 2
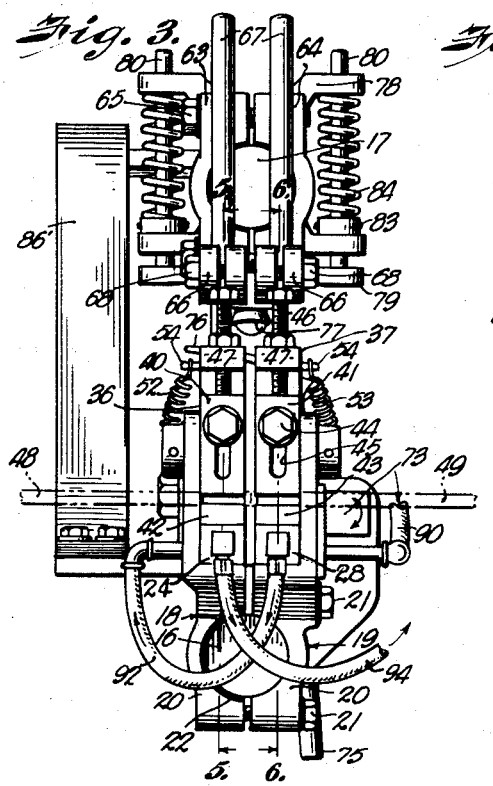
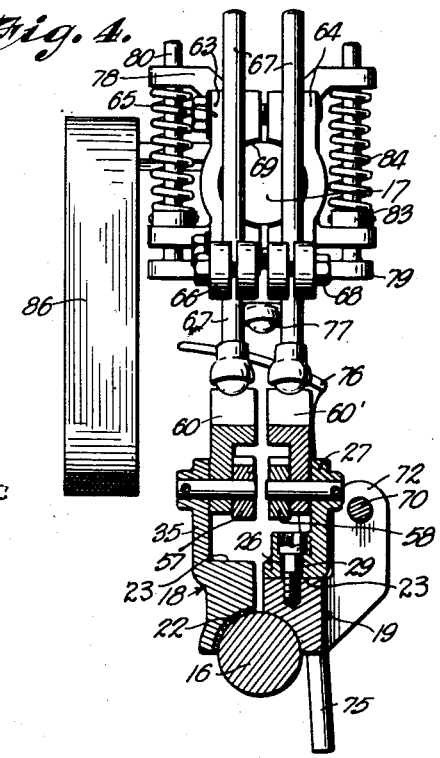
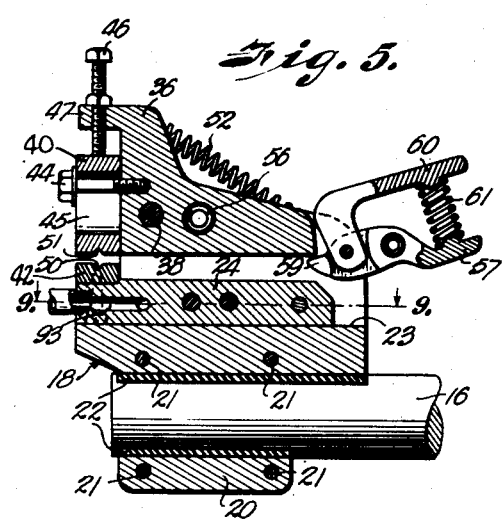
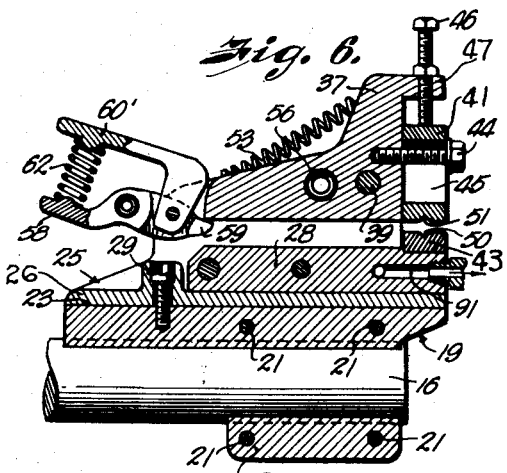
INVENTOR.
Joseph A. Fotie
BY Thos. E. Scofield
ATTORNEY.

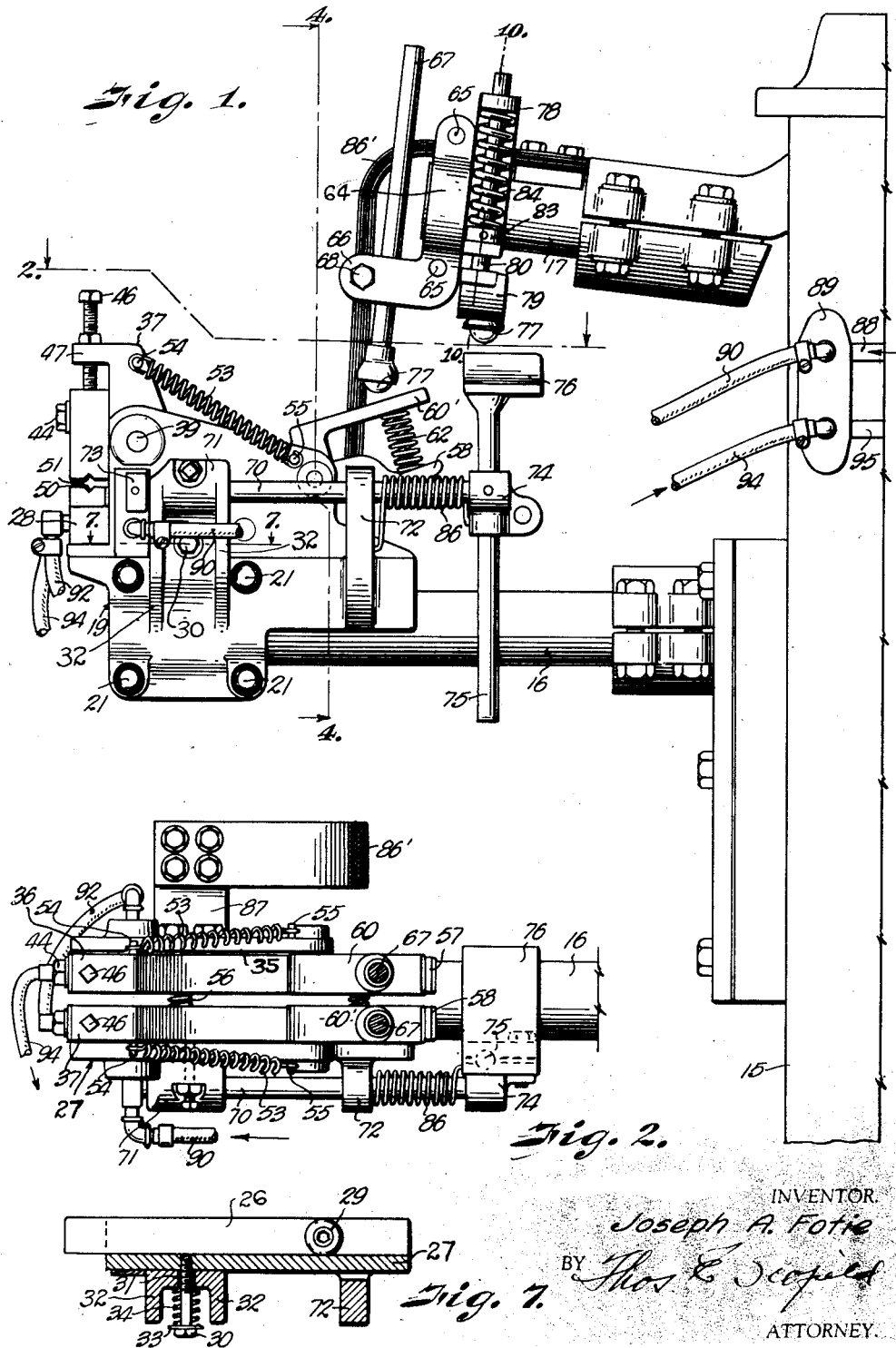

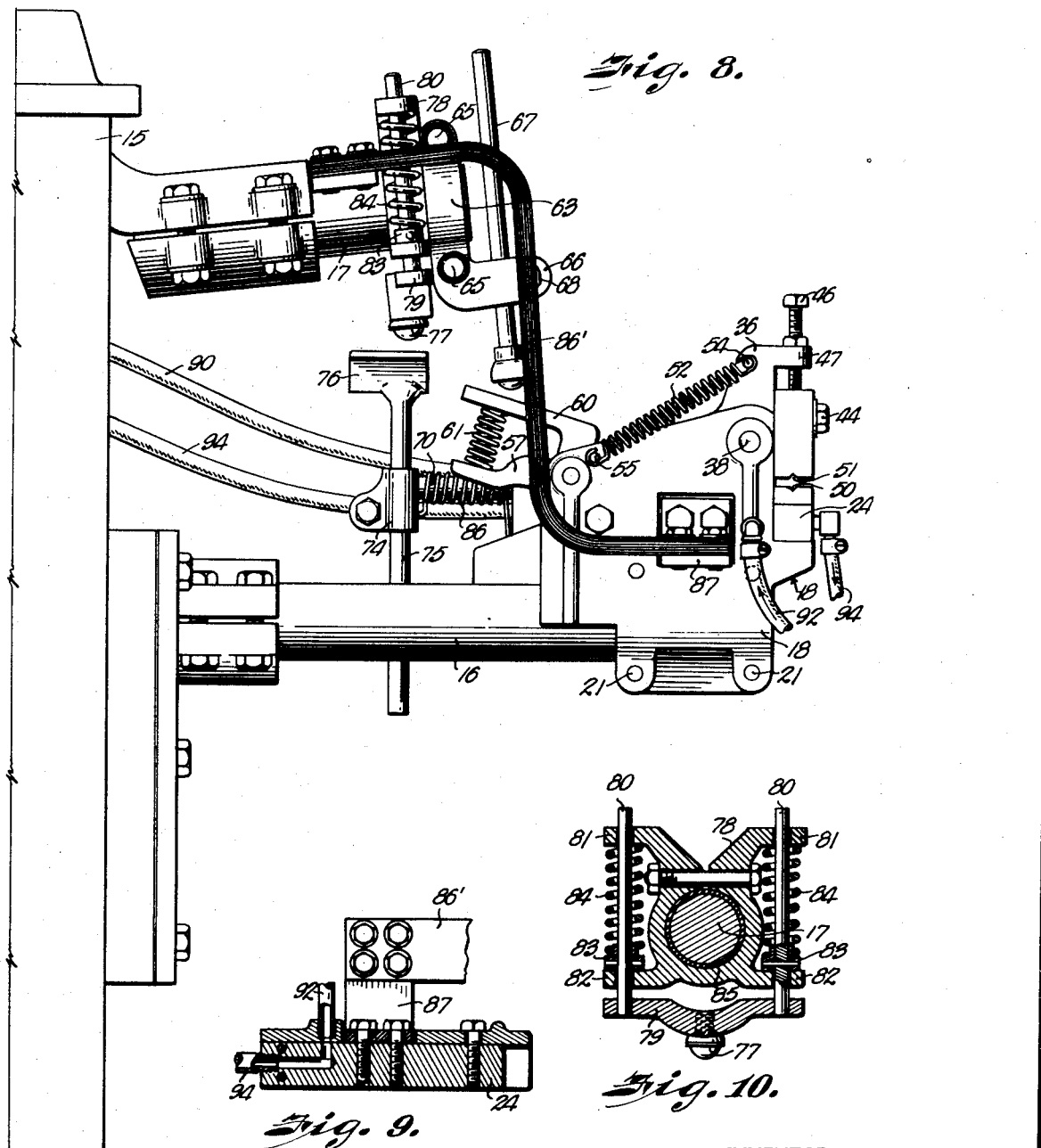

Patented July 7, 1942

2,288,693

UNITED STATES PATENT OFFICE 2,288,693

WELDING APPARATUS

Joseph A. Fotie, Kansas City, Mo.

Application August 20, 1941, Serial No. 407,526

8 Claims. (Cl. 219—4)

My invention relates to improvements in welding apparatus.

An important object of my invention is to provide a butt welding attachment for welding machines that is operative to first clamp separate work pieces in a manner to properly align the adjacent ends thereof and to thereafter move the mentioned ends of the work pieces into abutting engagement so that an electrical current caused to pass through the said work pieces, will fuse the abutting ends thereof and integrally join the pieces, the above operations being automatically sequentially performed in the above manner as a result of a single operation of the operating mechanism of the machine.

Another object of my invention is to provide a butt welding attachment of the above mentioned character that is light and compact in its construction and wherein the several parts comprising the same are uniquely combined and correlated in a manner to be easily applied to or removed from a welding machine.

Other objects and advantages of my invention will be apparent during the course of the following description.

In the drawings, forming a part of this specification, and wherein like numerals are employed to designate like parts throughout the same, Fig. 1 is a side elevation of a butt welding attachment embodying my invention and showing the same operatively mounted on the stationary and movable horns of a welding machine, Fig. 2 is a fragmentary transverse sectional view taken on the line 2—2 of Fig. 1, Fig. 3 is a front elevation of my device, Fig. 4 is a vertical sectional view taken on the line 4—4 of Fig. 1, Fig. 5 is a vertical sectional view taken on the line 5—5 of Fig. 3, Fig. 6 is a vertical sectional view taken on the line 6—6 of Fig. 3, Fig. 7 is a fragmentary transverse sectional view taken on the line 7—7 of Fig. 1 and illustrating the manner in which the movable clamping and welding jaw embodying a part of my invention is mounted on the attachment, Fig. 8 is a side elevation of the attachment and showing the side thereof opposed to the side illustrated in Fig. 1, Fig. 9 is a transverse sectional view taken on the line 9—9 of Fig. 5, and Fig. 10 is a vertical sectional view taken on the line 10—10 of Fig. 1, In the accompanying drawings, wherein for the purpose of illustration, is shown a preferred embodiment of my invention, the numeral 15 designates the frame of a welding machine. The stationary and movable horns 16 and 17 project forwardly of the frame, the stationary horn being located below the movable horn and the movable horn being pivoted within the frame for movement about a horizontal axis. By way of example, I have illustrated my butt welding attachment as being mounted on the welding machine described and illustrated in my copending application, Serial No. 388,308, filed April 12, 1941, though it will be obvious that the attachment may be used with welding machines constructed differently than the machine illustrated in my copending application, and it is to be understood that I have illustrated my butt welding attachment as being mounted on this machine for the purpose of illustration and not by way of limitation.

Detachably mounted on the stationary lower arm or horn 16 are relatively movable clamping and welding jaws which operate vertically to first clamp separate work pieces and thereafter automatically operate horizontally to move the work pieces into welding relationship. Each of the jaws includes a stationary jaw supporting member 18 and 19. Each of the jaw supporting members is provided with a depending clamping arm 20 which extends in embracing relation to the supporting horn of the welding machine, the arms being fixedly associated therewith by means of the bolts 21. As best illustrated in Figs. 3 and 4, the jaw supporting members are spaced laterally of each other and the member 18 is electrically insulated from the horn 16 and from the supporting member 19 by interposed strips of rubber 22 or other suitable insulating material. Each of the jaw supporting members is formed with a horizontal shoulder 23, the shoulder of the supporting member 18 being disposed slightly above the adjacent shoulder of the supporting member 19. The lower jaw 24 is seated on the shoulder 23 of the supporting member 18 and is bolted or otherwise fixedly secured thereon. An element 25 is mounted on the relatively lower shoulder 23 of the supporting member 19, which element includes an inturned flange portion 26 and an upstanding outer flange portion 27, the flange 26 resting upon the shoulder 23 of the supporting member 19 and the top surface of the flange 26 extending flush with the shoulder 23 of the supporting member 18. A lower jaw 28 is fixedly mounted on the flange portion 26 of the element 25, the latter being pivoted on a screw bolt shown in Fig. 6 to impart horizontal movement to the jaw to bring the work pieces into welding relationship.

In order to maintain the lower jaws 24 and 28 a spaced distance apart and assure the return of movable jaw 28 to a non-welding position, I have provided a bolt 30 screwed into flange 27. This bolt passes through a hole 31 in the channel shaped support, there being clearance provided between the channel support and the bolt. The washer 33 is disposed adjacent to the head of the bolt to provide a stop means against which the outer end of the coil spring 34 may seat, the inner end of the spring being seated against the outer face of the channel support 32. Manifestly, movement of the element 25 about the pivot 29 toward jaw 24 will compress the spring 34. When the element is released, the coil spring 34 will immediately return the same to its initial position against the channel 32. I have also provided a helper string 56 which is interposed between the upper jaws and has the opposite ends thereof seated in sockets in the confronting faces of the jaws. The spring 56 assists the spring 34 in urging the two jaws apart.

The support 18 is formed at its outer side with an upstanding flange portion 35. The upstanding flange portion 35 and the upstanding flange portion 27 of the element 25 are of the same height and each of these flanges extends above the jaws 24 and 28. Pivoted for vertical rocking movement to the flanges 35 and 27 are upper jaws 36 and 37, the jaw 36 positioned above the lower jaw 24 and the jaw 37 positioned above the lower jaw 28. As illustrated in Figs. 5 and 6, pivots 38 and 39 are positioned near the front of the jaws in order to obtain an increased leverage and a tight gripping of the work pieces. Upper grippers 40 and 41 are carried by the jaws 36 and 37 respectively and lower grippers 42 and 43 are carried by jaws 24 and 28 respectively. The upper grippers are adjustably secured to their respective jaws by means of bolts 44 and slots 45. Holding screws 46 equipped with lock nuts threaded through lugs 47 serve to maintain the grippers in an adjusted position. The lower grippers are removable and I prefer that both the upper and lower grippers be formed of a suitable metal alloy having a high electrical conductivity and a high thermal resistivity. The separate work pieces such as steel rods 48 and 49 are placed between the grippers and are held by means of the groove surfaces 50 and 51 of the respective grippers.

The jaws of the grippers are positioned to bring the separate work pieces into alignment. Coil springs 52 and 53 are attached near the top of the upper jaws at 54 and to the flanges which carry the jaws at 55. The springs 52 and 53 thus normally act to rock the forward ends of the upper jaws in a direction away from the lower grippers to permit the ready insertion and removal of the work pieces from between the pairs of grippers.

I have provided mechanism for first elevating the rearward ends of the upper jaws which cause the work pieces to be gripped. There is also provided mechanism for thereafter pivoting element 25 on its pivot 29 resulting in the movement of work piece 49 into abutment and welding relationship with work piece 48.

The mechanism for rocking the upper jaws comprise lever arms 57 and 58, pivotally mounted on the flange portions 35 and 27. Each of the levers is provided with an extending toe 59 which projects beneath the rear ends of the upper jaws. Rocking of the levers transmits their movement to the jaws. Buffer arms 60 and 60' are pivoted to levers 57 and 58, and between the arms and the levers are springs 61 and 62.

Clamps 63 and 64 are secured to the movable horn 17 by means of bolts 65 and are electrically insulated from the horn 17 by means of the rubber strips 69. Each clamp has a forwardly extending bifurcated arm 66 which carries a vertically adjustable rod 67 held in place by means of the bolts 68. The rods are positioned directly above the buffer arms. It may thus be seen that downward rocking movement of the horn 17 will cause the lower ends of the rod elements to press against the subjacent buffer arms and to rock the arms and levers 57 and 58 to which they are attached downwardly so that the forwardly extending toes of the levers will shift the upper jaws into clamping engagement with the work pieces 48 and 49. The springs 61 and 62 are of substantially greater strength than the coil springs 52 and 53 so that the former will yield only when excessive pressure is applied to the buffer arms by the actuating rods.

The mechanism for effecting lateral movement of the element 25 comprises a horizontally arranged rod 70 which is journaled for rotation in the sleeve 71 formed at the upper end of the channel 32 and in an upstanding bearing support 72 carried by the support 19. A cam 73 fixedly mounted on the forward end of the rod 70 presses against the side of the element 25 so that rotation of the rod will cause the cam to bear against the element and to move the same inwardly about the pivot 29. Fixedly mounted on the rearward end of the rod 70 is a bracket 74 which adjustably receives the vertical shank portion 75 of the cam plate 76. As best illustrated in Figs. 1 and 4, the cam plate inclines upwardly and inwardly from the shank 75. It is arranged below the frictionless ball mounted in a plate 79 the ends of which carry pins 80. The pins are slidably received in vertically aligned openings in the arms 81 and 82, projecting laterally of the bracket 78. Downward movement of the plate 79 is limited by stop 83 and upward movement of the plate is yieldably resisted by coil springs 84 interposed between the stop members and the upper bracket arms 81. It will be observed that the bracket 78 is suitably insulated from the horn 17 by means of the insulating sleeve 85.

As the horn 17 moves downwardly, the ball 77 will contact the cam plate 76 and, by reason of its inclined surface, it will impart rotation to the rod 70. As hereinabove described, rotation of the rod will cause the cam 73 to shift the element 25 in the direction of the stationary clamping jaws and about the pivot 29. A coil spring 86 sleeved about the portion of the rod extending between the bearing support 72 and the bracket 74 engages with the arm and bracket to yieldably resist rotation of the rod and to return the same to the initial position as soon as the cam plate 76 is released.

The vertically adjustable feature of the rods 67 and the manner in which the shank 75 of the cam plate is vertically adjustable relative to the knob 77 will permit these parts to be easily adjustable and timed so that the rods 67 will first engage the buffer arms to move the upper jaws into clamping engagement with the work pieces. The knob 77 will thereafter shift the element 25 laterally to bring the work pieces into welding position.

An electric current is supplied to the welding machine in the conventional manner. The secondary leads from the transformer (not shown) mounted in the housing 15 connect with the stationary and movable horns 16 and 17 respectively. A conductor 86' in the nature of a plurality of laminated copper strips, is attached at one end to the movable horn 17 and, at the other end, to a bracket 87, projecting from the supporting member 18. As previously suggested, the member 18 is insulated from the lower horn 16 and current will consequently only be supplied to the upper and lower jaws 36 and 24 which jaws will transmit the same to the work piece 48. Obviously, current supplied to lower horn 16 will be transmitted directly to the supporting member 19 which has a conducting connection with the horn. Consequently, current from the lower horn will be supplied to the upper and lower jaws 37 and 28, which will in turn transmit the current to the work piece 49 clamped therebetween.

When the mechanism for shifting the element 25 laterally is operated to move the adjacent ends of the work pieces into abutting engagement with each other, the current will be short-circuited through the work pieces to accomplish the welding operation.

To dissipate the heat generated during the welding operation I have provided means for cooling the jaws. A conduit 88 from a water supply connects with the water manifold 89 mounted on the housing frame. A passage through the member permits the water to flow through conduit 90 and into a passage 91 in the lower jaw member 28. The passage 91 is sufficiently extensive to effect proper cooling of the jaw 28 and the gripper 43. A conduit 92 is connected to the discharge outlet of passage 91 and directs the cooling water to a passage 93 in the opposite lower jaw 24, shown in Fig. 5. On discharge from passage 93 the cooling medium is directed through conduit 94 back to manifold 89 and is discharged to a drain or cooling water reservoir if it is to be reused. Thus, a continuous stream of water or other suitable cooling fluid will flow through the passages 91 and 93 in the lower welding jaws of the device to counteract the extreme heat developed during the welding operation.

I have thus provided an attachment for a welding machine which may be readily applied to or removed from the machine and which comprises relatively movable clamping and welding jaws mounted on the lower horn of the machine. I have provided a mechanism for actuating the jaws to clampingly engage work pieces placed therebetween and a separate mechanism for shifting the welding jaws relative to each other to move the adjacent ends of the work pieces into abutting engagement. In addition to the above, I have provided an actuator mechanism embodying ajustable features which permit the same to first operate the jaw clamping mechanism and to thereafter actuate the mechanism for shifting the welding jaws toward each other. The above operations are accomplished by a single downward movement of the horn 17, which horn may be either manually operated or operated by a suitable power drive mechanism.

It is to be understood that the form of my invention herein shown and described is to be taken as a preferred example of the same and that various changes in the size, shape and arrangement of parts may be resorted to without departing from the spirit of my invention or the scope of the appended claims.

Having thus described my invention, I claim:

1. A butt welding attachment for use with a welding machine of the type including a stationary arm and a rocker arm, spaced pairs of clamping and welding jaws supported on the stationary arm adapted to clamp separate work pieces and to move the same relative to each other, means for transmitting current to each of the welding jaws, a mechanism for moving the clamping jaws relative to each other, and a separate mechanism for moving the welding jaws relative to each other, actuator means carried by and movable with the rocker arm, said actuator means operating the mechanisms in timed relationship so that one operation of the rocker arm will first clamp the work pieces and thereafter bring the same into welding relationship.

2. A butt welding attachment for use with a welding machine of the type including a stationary arm and a rocker arm, spaced pairs of clamping and welding jaws supported on the stationary arm adapted to clamp separate work pieces and to move the same relative to each other, means for transmitting current to each of the welding jaws, a mechanism for moving the clamping jaws relative to each other, and a separate mechanism including a cam acting against one of the welding jaws for moving the welding jaws relative to each other, each of said mechanisms having a driven connection with the rocker arm and the relationship of the mechanisms with the rocker arm being such that operation of the rocker arm will first actuate the jaws to grip the work pieces and thereafter actuate the said jaws to bring the work pieces into welding relationship.

3. A butt welding attachment for use with a welding machine of the type including a stationary arm and a rocker arm, spaced pairs of clamping and welding jaws supported on the stationary arm adapted to clamp separate work pieces and to move the same relative to each other, means for transmitting current to each of the welding jaws, a mechanism including pivoted levers for moving the clamping jaws relative to each other, a separate mechanism for moving the welding jaws relative to each other, each of said mechanisms having a driven connection with the rocker arm whereby one operation of the rocker arm will first rock the said pivoted levers to move the clamping jaws into clamping engagement with the work pieces and thereafter bring the same into welding relationship, and means coacting with said jaws to return the same to an initial position after each operation of the rocker arm.

4. A butt welding attachment for use with a welding machine of the type including a stationary arm and a rocker arm, spaced pairs of clamping and welding jaws supported on the stationary arm adapted to clamp separate work pieces and to move the same relative to each other, means for transmitting current to each of the welding jaws, a mechanism including pivoted levers for moving the clamping jaws relative to each other, separate mechanism including a cam acting against one of the welding jaws for moving the welding jaws relative to each other, each of said mechanisms having a driven connection with the rocker arm whereby one operation of the rocker arm will first actuate the pivoted levers of the first mechanism to clamp the work pieces and thereafter actuate the cam of the second mechanism to bring the same into welding relationship, means coactive with the said jaws to return the same to an initial position after each operation of the rocker arm, and adjustable means engageable with the jaws for regulating the said initial position.

5. In an electrical welding machine, a stationary arm, spaced pairs of relatively movable clamping and welding jaws supported by the arm adapted to clamp separate work pieces, said jaws being also independently relatively movable to bring the work pieces into welding relationship, means for supplying an electric current to each of said welding jaws, an actuating mechanism, means operable by the actuating mechanism for shifting the said jaws into clamping engagement with the work pieces, and a second means operable by the actuating mechanism after the said jaws have clamped the work pieces to shift the jaws into a position to bring the work pieces into welding relationship.

6. In a welding machine, a stationary supporting member, a pair of laterally spaced lower jaws each having an upstanding flange, said jaws being supported by the said supporting member and at least one of said jaws being mounted for lateral adjustment relative to the other of the jaws, means for supplying an electrical current to each of the lower jaws, a pair of upper jaws each pivoted to the upstanding flange of a respective one of the said lower jaws, an actuator, a mechanism for moving the upper jaws relative to the said lower jaws, a mechanism for effecting lateral adjustment of the lower jaws, and a connection from the actuator to said mechanisms, the arrangement being such that movement of the said actuator will first operate the said first mechanism to move the upper jaws toward the said lower jaws and thereafter operate the second mechanism to effect lateral adjustment of the said lower jaws.

7. The combination as set forth in claim 6, wherein the said first mechanism comprises pivoted levers, each of said levers having a toe portion arranged to rock a respective one of the upper jaws about its pivot, a companion lever arm pivoted to each of the said first levers, and spring means interposed between each lever and its respective lever arm, the said lever arms being arranged in proximity to the said actuator whereby operation of the said actuator will move the same into simultaneous engagement with the lever arms to rock the levers about their pivots, the said spring means being adapted to yield when excessive pressure is applied to the lever arms by the said actuator.

8. The combination as set forth in claim 6 wherein the second mechanism comprises a rod mounted for rotation laterally of the said adjustable lower jaw, a cam fixed to each end of the said rod, one of the cams being engageable with the said shiftable lower jaw and the other of the cams being located in proximity to the said actuator whereby operation of the actuator will move the same into engagement with the said last cam to effect rotation of the rod and to move the said first cam against the adjustable lower jaw.

JOSEPH A. FOTIE.